Patented Nov. 21, 1944

2,363,462

UNITED STATES PATENT OFFICE 2,363,462

ACETONYL THIOETHERS

Glen H. Morey, Terre Haute, Ind., assignor to Commercial Solvents Corporation, Terre Haute, Ind., a corporation of Maryland No Drawing. Application March 8, 1941, Serial No. 382,339

4 Claims. (Cl. 260—593)

My invention relates to new and useful organic sulfur compounds, and more particularly to a new class of thioethers.

The thioethers of my present invention constitute the class of acetonyl thioethers represented by the general formula:

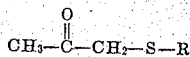

in which R is an aliphatic radical, the sum of whose atomic weights is greater than 29. These thioethers have reactive carbonyl groups, and reactive hydrogen atoms adjacent the carbonyl groups, and are useful for the production of derivatives by known ketone reactions.

The acetonyl thioethers of this class may be prepared by the reaction of a monohalogenated acetone with a mercaptan of the type RSH, in which R is an aliphatic radical having an equivalent weight greater than 29. Any monohalogenated acetone may be employed for this purpose, but chloroacetone and bromoacetone are more desirable, particularly the former. Among the mercaptans of the above class, there may be mentioned those in which R represents alkyl, cycloalkyl, alkylene, haloalkyl, hydroxyalkyl, ketoalkyl, and the like. Specific examples of such mercaptans are i-propyl mercaptan, n-butyl mercaptan, i-amyl mercaptan, cyclohexyl mercaptain, allyl mercaptain, beta-chloroethyl mercaptan, thioglycol, and acetonyl mercaptan.

The reaction may be effected between the monohalogenated acetone and the free mercaptan, or between the monohalogenated acetone and a salt of the marcaptan, such as an alkali or alkaline earth metal salt. The latter type of reaction is preferable, since in this case a metal halide constitutes the concurrent reaction product, and substantially neutral conditions may be maintained throughout. If the free mercaptan is employed in the reaction, a halogen acid is the concurrent reaction product, and the resulting acidity tends to cause tar formation, with reduced yields of thioether. It is, of course, obvious that alkaline conditions should also be avoided, since such conditions favor condensation or polymerization reactions of halogenated ketones, which also tend to reduce the yield of thioether in the process.

The reaction is desirably effected in an inert solvent which is a mutual solvent for both of the reactants, and preferably is a selective solvent for one of the reaction products. Many solvents are suitable for this purpose, but it is generally preferred to employ water, or an alcohol or a hydrocarbon solvent of relatively low boiling point, as, for example, ethyl alcohol, i-propyl alcohol, n-butyl alcohol, benzene, toluene, or xylene. The use of a relatively low boiling solvent is particularly desirable if the free mercaptan is employed in the reaction, since in this case the solvent mixture may be refluxed to sweep out the gaseous hydrogen halide as it is formed in the reaction. The same effect could be secured by bubbling an inert gas through the reaction mixture, since elevated temperatures are generally unnecessary for this reaction. When a mercaptide rather than a free mercaptan is employed in the process, the reaction is desirably effected at ordinary room temperature, or at temperatures up to 40° C. When the reaction is apparently concluded, the mixture may suitably be heated to a higher temperature for a short time to ensure complete reaction.

Approximately equimolar amounts of monohalogenated acetone and mercaptan are suitably employed in the reaction, although an excess of either of the reactants may be employed, if desired. At the conclusion of the reaction, unreacted reactants and the concurrently-produced halide may be separated by standard methods. Residual halogen acid and unconsumed reactants may usually be separated by distillation; and metal halides may be separated by filtration, if the reaction was effected in an organic solvent. Other suitable separation procedures will, of course, be apparent to those skilled in the art.

My invention may be further illustrated by the following specific examples:

Example I

Approximately 270 parts by weight of n-butyl mercaptan was slowly added to a refluxing mixture of 395 parts by weight of chloroacetone and 445 parts by weight of benzene. After the evolution of hydrogen chloride had ceased, the benzene was distilled off, and the residual product was fractionally distilled under reduced pressure. Substantially all of the product was a pure fraction boiling at 116° C. (50 mm.). The butyl acetonyl thioether thus obtained amounted to 80.8% of the thoretical yield. This product was a clear yellow liquid having a faint sulfide-like odor, and a melting point of −49.5° C.

Analysis: Calculated sulfur content of butyl acetonyl thioether, 21.93%; found, 21.95%. Calculated molecular weight, 146; found, 148.7.

Example II

Approximately 400 parts by weight of sodium hydroxide was dissolved in 2000 parts by weight of water, and approximately 900 parts by weight of n-butyl mercaptain was added while the mixture was stirred rapidly and its temperature maintained at approximately 30° C. To the resulting solution there was slowly added 925 parts by weight of chloroacetone. During this addition the mixture was stirred and maintained at a temperature below 30° C. After all of the chloroacetone had been added, the temperature was raised to 70° C. for about 15 minutes, and the mixture was then cooled, and allowed to separate. The aqueous layer containing the sodium chloride was discarded, and the oily layer was distilled under reduced pressure. Butyl acetonyl thioether, boiling at 116° C. (50 mm.) was obtained in a yield of 87.8% of the theoretical yield.

*Example III*

A solution of potassium hydrogen sulfide was prepared by saturating with hydrogen sulfide a solution of 280 parts by weight of potassium hydroxide in 1600 parts by weight of 95% ethyl alcohol. To this mixture was added 415 parts by weight of ethylene chlorohydrin, after which it was boiled for 15 minutes, cooled, and filtered to remove the potassium chloride formed in the reaction. The filtrate constituted an alcoholic solution of beta-hydroxyethyl mercaptan (thioglycol). To this solution 555 parts by weight of chloroacetone was added, and the mixture was refluxed for 15 hours. At the end of this time, the excess chloroacetone and the ethyl alcohol were removed by vacuum distillation. The beta-hydroxy-ethyl acetonyl thioether was recovered as a yellow oil, which distilled at 100° C. (5 mm.).

Analysis: Calculated sulfur content of beta-hydroxyethyl acetonyl thioether, 23.89%; found, 24.25%.

*Example IV*

A solution of sodium hydrosulfide was prepared by dissolving 400 parts by weight of sodium hydroxide and 1000 parts by weight of water, and saturating with hydrogen sulfide. To this solution 925 parts by weight of chloroacetone was slowly added while the mixture was stirred rapidly, and its temperature maintained below 30° C. The mixture was allowed to stand at this temperature for a few hours, and was then filtered to remove a solid reaction product of unknown composition. The filtrate was allowed to separate, and the oil layer was cooled to crystallize out the acetonyl thioether, which was then recrystallized from ethyl ether. The acetonyl thioether constituted a solid of transparent plate-like crystal structure, melting at 45° C.

Analysis: Calculated sulfur content of acetonyl thioether, 21.93%; found, 22.24%. Calculated molecular weight of acetonyl thioether, 146.1; found, 153.5. The product was further identified as acetonyl thioether by the preparation of the 2,4-dinitrophenylhydrazone, which was found to melt at 185.3° C.

Analysis: Calculated sulfur content of 2,4-dinitrophenylhydrazone of acetonyl thioether, 6.32%; found, 6.34%.

It may be noted that the above example differs from the preceding examples in the method of preparation of the thioether. In this case sodium hydrosulfide, rather than a mercaptan, was used as the initial reactant, and no attempt was made to isolate the acetonyl mercaptan, which undoubtedly constituted an intermediate in the reaction.

It is to be understood, of course, that the above examples are merely illustrative, and that my invention is not limited to the particular thioethers of the examples. My invention includes the entire class of acetonyl thioethers as previously defined, and as set forth in the appended claims. This class of thioethers comprises relatively non-volatile compounds ranging from oily liquids of slight sulfide odor, to the higher molecular weight products which are crystalline solids of very slight odor, or no perceptible odor. This class of compounds is subject to identifying tests for carbonyl and sulfide groups, such as the formation of oximes, phenylhydrazones, sulfoxides, sulfones, and the mercuric chloride addition products.

My invention now having been described, what I claim is:

1. In a process for the preparation of acetonyl thioethers of the general formula

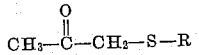

in which R is an aliphatic radical, the sum of whose atomic weights is greater than 29, the steps which comprise reacting a monohalogenated acetone with a mercaptan of the type

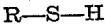

in which R is an aliphatic radical having an equivalent weight greater than 29, under substantially neutral conditions and in the presence of a mutual solvent for said monohalogenated acetone and mercaptan, to produce said acetonyl thioether and the corresponding hydrogen halide, and removing said hydrogen halide from the reaction mixture as it is formed therein.

2. In a process for the preparation of acetonyl thioethers of the general formula

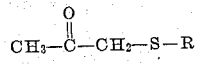

in which R is an aliphatic radical, the sum of whose atomic weights is greater than 29, the steps which comprise reacting a monohalogenated acetone with a mercaptan of the type

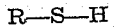

in which R is an aliphatic radical having an equivalent weight greater than 29, under substantially neutral conditions and in the presence of a mutual solvent for said monohalogenated acetone and mercaptan, to produce said acetonyl thioether and the corresponding hydrogen halide, and removing said hydrogen halide from said mixture as it is formed therein by effecting the reaction at the approximate reflux temperature of said mixture.

3. In a process for the preparation of butyl acetonyl thioether, the steps which comprise reacting butyl mercaptan with a monohalogenated acetone under substantially neutral conditions and in the presence of a mutual solvent for said butyl mercaptan and monohalogenated acetone, to produce said butyl acetonyl thioether and the corresponding hydrogen halide, and removing said hydrogen halide from said mixture as it is formed therein by effecting the reaction at the approximate reflux temperature of said mixture.

4. In a process for the preparation of beta-hydroxyethyl acetonyl thioether, the steps which comprise reacting thioglycol with a monohalogenated acetone under substantially neutral conditions, and in the presence of a mutual solvent for said thioglycol and monohalogenated acetone, to produce said beta-hydroxyethyl acetonyl thioether and the corresponding hydrogen halide, and removing said hydrogen halide from said mixture substantially as it is formed therein, by effecting the reaction at the approximate reflux temperature of said mixture.

GLEN H. MOREY.